United States Patent [19]

Schmitt et al.

[11] 3,920,978

[45] Nov. 18, 1975

[54] SPECTRUM ANALYZER

[75] Inventors: Joseph W. Schmitt, Hudson; Donald L. Starkey, Amherst, both of N.H.

[73] Assignee: Sanders Associates, Inc., Nashua, N.H.

[22] Filed: Feb. 25, 1974

[21] Appl. No.: 445,746

[52] U.S. Cl. .................................................. 235/156
[51] Int. Cl.$^2$ .......................................... G06F 15/34
[58] Field of Search ......... 235/156; 324/77 D, 77 G

[56] References Cited

UNITED STATES PATENTS

| | | | |
|---|---|---|---|
| 3,588,460 | 6/1971 | Smith | 235/156 |
| 3,673,399 | 6/1972 | Hancke et al. | 235/156 |
| 3,721,812 | 3/1973 | Schmidt | 235/156 |
| 3,777,131 | 12/1974 | Llewellyn | 235/156 |
| 3,783,258 | 1/1974 | Chwastyk | 235/156 |
| 3,803,391 | 4/1974 | Vernet | 235/152 |

*Primary Examiner*—David H. Malzahn
*Attorney, Agent, or Firm*—Louis Etlinger; Robert Tendler

[57] ABSTRACT

A signal spectrum analyzer generates the discrete Fourier coefficients of a sampled-data signal applied as input thereto by repetitively passing sets of data points through the same configuration-invariant transform network to thereby achieve high transformation speed with minimal system complexity.

16 Claims, 9 Drawing Figures

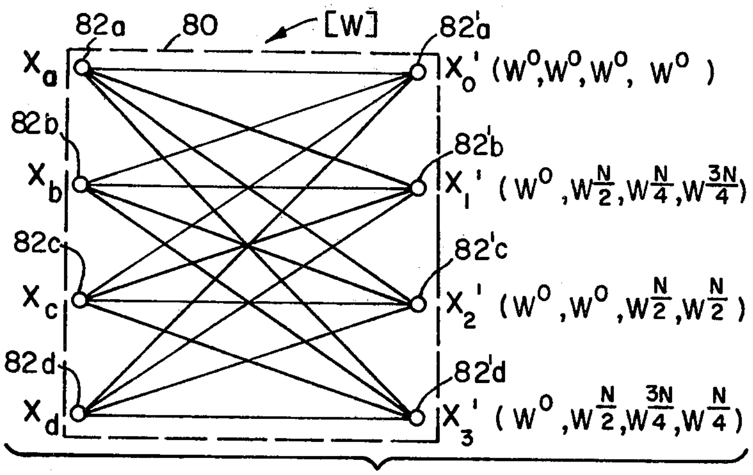

FIG. 2A $$\begin{bmatrix} W^0 & W^0 & W^0 & W^0 \\ W^0 & W^{\frac{N}{2}} & W^{\frac{N}{4}} & W^{\frac{3N}{4}} \\ W^0 & W^0 & W^{\frac{N}{2}} & W^{\frac{N}{2}} \\ W^0 & W^{\frac{N}{2}} & W^{\frac{3N}{4}} & W^{\frac{N}{4}} \end{bmatrix} \begin{bmatrix} X_a \\ X_b \\ X_c \\ X_d \end{bmatrix} = [W]\,[X]$$

FIG. 2B $$\underbrace{\begin{bmatrix} 1 & 1 & 1 & 1 \\ 1 & -1 & -j & j \\ 1 & 1 & -1 & -1 \\ 1 & -1 & j & -j \end{bmatrix}}_{[W]} \underbrace{\begin{bmatrix} X_0 \\ X_1 \\ X_2 \\ X_3 \end{bmatrix}}_{[X]} = \underbrace{\begin{bmatrix} I_a - I_b + I_c + I_d \\ I_a - I_b + Q_c - Q_d \\ I_a + I_b - I_c - I_d \\ I_a + I_b - Q_c + Q_d \end{bmatrix}}_{[I]} + j \underbrace{\begin{bmatrix} Q_a - Q_b + Q_c + Q_d \\ Q_a - Q_b - I_c + I_d \\ Q_a + Q_b - Q_c - Q_d \\ Q_a + Q_b + I_c - I_d \end{bmatrix}}_{[Q]}$$

FIG. 2C

2 MSBs OF REVERSE ADDRESS

| REGISTERS 44 | 00 | 10 | 01 | 11 |
|---|---|---|---|---|
| a | $I_a$ | $I_b$ | $I_c$ | $I_d$ |
| b | $I_a$ | $-I_b$ | $Q_c$ | $-Q_d$ |
| c | $I_a$ | $I_b$ | $-I_c$ | $-I_d$ |
| d | $I_a$ | $I_b$ | $-Q_c$ | $Q_d$ |

| REGISTERS 44' | 00 | 10 | 01 | 11 |
|---|---|---|---|---|
| a' | $Q_a$ | $Q_b$ | $Q_c$ | $Q_d$ |
| b' | $Q_a$ | $-Q_b$ | $-I_c$ | $I_d$ |
| c' | $Q_a$ | $Q_b$ | $-Q_c$ | $-Q_d$ |
| d' | $Q_a$ | $Q_b$ | $I_c$ | $-I_d$ |

FIG. 2D

| NORMAL COUNT | | P=1 DATA ADDRESS | | P=2 DATA ADDRESS | | P=2 PHASE CORRECTION FACTOR | | F |
|---|---|---|---|---|---|---|---|---|
| 0 | 0 0 0 0 | 0 | 0 0 0 0 | 0 | 0 0 0 0 | 0 | (0 0) X (0 0) | $F_0$ |
| 1 | 0 0 0 1 | 8 | 1 0 0 0 | 2 | 0 0 1 0 | 0 | (1 0) | $F_2$ |
| 2 | 0 0 1 0 | 4 | 0 1 0 0 | 1 | 0 0 0 1 | 0 | (0 1) | $F_1$ |
| 3 | 0 0 1 1 | 12 | 1 1 0 0 | 3 | 0 0 1 1 | 0 | (1 1) | $F_3$ |
| 4 | 0 1 0 0 | 2 | 0 0 1 0 | 8 | 1 0 0 0 | 0 | (0 1) X (0 0) | $F_8$ |
| 5 | 0 1 0 1 | 10 | 1 0 1 0 | 10 | 1 0 1 0 | 2 | (1 0) | $F_{10}$ |
| 6 | 0 1 1 0 | 6 | 0 1 1 0 | 9 | 1 0 0 1 | 1 | (0 1) | $F_9$ |
| 7 | 0 1 1 1 | 14 | 1 1 1 0 | 11 | 1 0 1 1 | 3 | (1 1) | $F_{11}$ |
| 8 | 1 0 0 0 | 1 | 0 0 0 1 | 4 | 0 1 0 0 | 0 | (1 0) X (0 0) | $F_4$ |
| 9 | 1 0 0 1 | 9 | 1 0 0 1 | 6 | 0 1 1 0 | 4 | (1 0) | $F_6$ |
| 10 | 1 0 1 0 | 5 | 0 1 0 1 | 5 | 0 1 0 1 | 2 | (0 1) | $F_5$ |
| 11 | 1 0 1 1 | 13 | 1 1 0 1 | 7 | 0 1 1 1 | 6 | (1 1) | $F_7$ |
| 12 | 1 1 0 0 | 3 | 0 0 1 1 | 12 | 1 1 0 0 | 0 | (1 1) X (0 0) | $F_{12}$ |
| 13 | 1 1 0 1 | 11 | 1 0 1 1 | 14 | 1 1 1 0 | 6 | (1 0) | $F_{14}$ |
| 14 | 1 1 1 0 | 7 | 0 1 1 1 | 13 | 1 1 0 1 | 3 | (0 1) | $F_{13}$ |
| 15 | 1 1 1 1 | 15 | 1 1 1 1 | 15 | 1 1 1 1 | 9 | (1 1) | $F_{15}$ |

SPECTRUM ANALYZER

BACKGROUND OF THE INVENTION

1. Field of the Invention

The invention relates to signal analyzers and, more particularly, to a signal analyzer which calculates the Fourier coefficients of a sampled-data signal applied as input thereto.

2. Prior Art

Information about operating systems, whether human or otherwise, is transmitted from one entity to another in the form of signals whose characteristics represent the information to be transmitted. These signals are processed by the receiving entity to thereby extract the information of interest. Digital signals represent the information being transmitted by discrete values of quantities such as voltage, phase, or frequency. Analog signals represent the information by means of generally continuous variations of these quantities. One characteristic of frequent interest in analog signals is the magnitude and phase of the various frequency (spectral) components comprising the signals. These components are denominated the "Fourier" components. Extraction of these components from a signal is known as "Fourier analysis" and the transformed signal is known as the "Fourier transform" of the input signal.

Various devices have commonly been used in the past to generate the Fourier transform of analog signals. Typically, these devices have operated in the analog domain. With the advent of high speed digital data processors, the transform is increasingly being performed in the digital domain. To accomplish this, the analog signal whose transform is to be determined is first digitized. It is well known that an analog signal may be reconstructed completely from equally spaced samples taken at a rate greater than twice the maximum frequency component in the signal. Thus, if the analog signal is sampled at a rate greater than twice its highest frequency component, the signal may be digitized and all information contained in the signal will be preserved. Digital data processors make use of this fact to perform the transform computation in the digital domain at high speeds. The transform is then known as discrete Fourier transform ("DFT") having a finite set of components $F(k\Omega)$, each of which is given by:

$$F(k\Omega) = \sum_{k=0}^{N-1} f(mT)(e^{-j\,\Omega\,T})^{mk} = \sum_{k=0}^{N-1} f(mT)\, W^{mk},$$

where $n$, $k$=0,1 . . . $N$−1,
$N$ is the number of samples to be converted, $T$ is the reciprocal of the sampling frequency, $\Omega$ is the frequency increment, $$\Omega = \frac{2\pi}{NT},$$

and $f(nt)$ are the sampled values of a function $f(t)$ at the sampling instants $nT$. $N$ is a power of 2.

The transform performed by those processors is generally accomplished by means of a "software program", that is, an ordered set of instructions applied to a general purpose digital computer directing the computer through a sequence of steps in the calculation of the transform. Since these computers are not particularized to the performance of any particular sequence of steps or "algorithm", the computational steps, even though each is performed in microseconds, consume significant time. The time required for performing a Fourier transform on a general purpose digital computer had been reduced in recent years through the use of an algorithm by Cooley and Tukey known as the "Fast Fourier Transform" ("FFT"). By means of this algorithm, the discrete Fourier transform is broken up into a number of shorter (fewer points) transforms whose sums can be calculated more quickly. The Fast Fourier Transform is described in detail in Gold and Rader, "Digital Processing of Signals", McGraw-Hill, Inc., 1969, at pages 173–201, as well as in U.S. Pat. No. 3,721,812 issued Mar. 20, 1973 to R. O. Schmidt. However, the time required to perform even a fast Fourier Transform on a storedprogram controlled digital computer is still substantial.

SUMMARY OF THE INVENTION

A. Objects of the Invention

Accordingly, it is an object of the invention to provide an improved signal analyzer.

Still a further object of the invention is to provide a spectral analyzer which generates the Fourier components of an input signal at high speeds and with minimal equipment complexity.

Yet a further object of the invention is to provide a spectral analyzer in which the generation of spectral components is performed under machine control without software guidance.

B. Brief Description of the Invention

In accordance with the invention, we provide a configuration-invariant "butterfly" network which operates on successive subsets of the data to be transformed. Each subset of data presented to the network is operated on in the identical manner. Thus, system complexity and cost are greatly reduced. The network has $m$ input nodes to which the data points to be transformed are applied, and has $m$ output nodes at which the transformed data appear for subsequent processing. The network transforms each of the data points at the input nodes by multiplying them by varying factors of:

$$W^{l\frac{N}{m}} = (e^{-j\,\Omega\,T})^{l\frac{N}{m}} = e^{-\frac{j2\pi}{m}l},\ l=0,1, \ldots m-1$$

In the present case, $m$ equals 4. The data are thus processed in subsets of four data points each and the factors multiplying the data points are:

$$W^{l\frac{N}{4}} = e^{-j\frac{\pi}{2}l}$$

Thus, each data point is multiplied by either +1 or −1 or $+j$ or $-j$.

The products obtained from multiplying each input point by the appropriate factors are summed into two distinct register sets, dependent on whether the resultant product is real or imgainary. Multiplication by +1 or −1 or by $+j$ or $-j$ thus involves merely steering the data point to the appropriate real or imaginary register set and there adding it into the register with or without a sign change. Effectively, then, the "multiplications" become simple additions and subtractions, which are inherently much faster than multiplications.

The data points in each subset are processed in timesequence. After all the points in a subset have passed through the transform network, they are returned to the memory addresses from whence they came. This is known as "in-place" processing. The next subset of data points is then called forth from memory for processing, processed, and again returned to the appropriate memory addresses. This continues for each subset of data points until all points in the set of input data have been processed. The processing of an entire set of points is commonly designated a "pass".

The number of passes required to complete the Fast Fourier Transform is given by $$p = \log_m N = \log_4 N \text{ in the present case}$$

For example, 16 input data points are completely transformed in two passes, 64 data points are completely transformed in three phases, etc. Prior to each pass, except the first, the data points to be operated upon must be phase-corrected. This phase-correction is performed by a bank of four multipliers (two each for the real and imaginary components of the input data points) which precede the transform network. These multipliers multiply the data points by factors of $W^\alpha$, where $\alpha$ is a function of N and P, and $P = 1,2, \ldots p$ is the number of the pass being processed. These factors will generally have both real and imaginary components and their values in the form of sine and cos magnitudes are stored in an addressable memory and fed to the multipliers in appropriate sequence. In accordance with the present invention, the selection of the appropriate phase correction factors, as well as the selection of the data points to be operated on at a given time, is calculated from the storage addresses of the data in memory.

Specifically, the N data points to be transformed are stored in a randomly-addressable read-write memory in normal sequence, that is, the first data point is stored at memory address 0, the second at memory address 1, etc. Since the Fourier coefficients are normally complex quantities, two memories are provided, one for the real components and one for the imaginary components. Both are simultaneously addressed by read-write commands to read data from, or write data into, the same address. A cyclic binary counter of length $r$ bits, where $r = log_2 N$ is used to generate the addresses of the data points to be processed during each pass as well as as the addresses of the phase-correction factors to be applied to the data points prior to their entry into the butterfly network.

The addresses of the data words during each pass are obtained by reversing the binary order of the contents of the counter, shifting the reversed contents $2(P-1)$ positions to the right, and prefixing the overflow bits (those bits shifted out by the right shift) to the shifted count as the most significant bits.

Reversing the contents of the counter is easily accomplished by reading the counter from right to left instead of from left to right. For example, as the counter steps through the normal binary sequence of 0,1,2,3, etc. the reverse count steps through the sequence 0,8,4,12, etc. As a specific example of data point address calculation, assume $N = 6$ data points are to be transformed. This requires $p = \log_4 16 = 2$ passes, and thus $P = 1,2$. During the first pass, $P = 1$, $2(P-1) = 0$ and the data point addresses are given by the reversed count without shifting, that is, the first four data points are taken from memory addresses 0,8,4,12. The next four points in the first pass are taken from addresses 2, 10, 6, 14.

During the next pass, $P = 2$ and each reverse count is shifted $2(2-1) = 2$ places to the right. This generates two overflow bits which then are prefixed to the shifted count as the two most significant bits. During this pass, the first four data points are taken from memory addresses 0,2,1,3, the next four from memory addresses 8,10,9,11, etc.

The phase-correction factors are stored in a read-only memory. Each address of this memory contains a phase correction factor $W^\alpha$ whose argument $\alpha$ is numerically equal to the address. Thus, $W^0$ is stored at address 0, $W^1$ at address 1, $W^2$ at address 2, etc. The address of the phase-correction factor (and thus the factor itself) corresponding to a selected data point is generated by multiplying the $2(P-1)$ most significant bits of the counter by the reversed two least significant bits during each pass except the first; during the first pass the phase correction is zero. Thus, for $N = 16$, the data read out from memory locations 8,9,10,11 during the second pass have corresponding phase-correction factors $W^0$, $W^2$, $W^1$, and $W^3$ obtained by taking the $2(2-1) = 2$ most significant bits (01) of the counter corresponding to these addresses and multiplying them by the bit-reversed two least significant bits (00, 10, 01 and 11, respectively). The phase-correction factors of each of the other data points are obtained in the same manner.

These data and phase-correction address generators are simply implemented and this leads to minimal cost and hardware complexity while achieving high speeds. For example, an analyzer constructed in accordance with the present invention has been able to perform a transform of $N = 1024$ points in less than 25 milliseconds, thus enabling real-time spectral analysis of signals of up to 40KHz bandwidth.

DETAILED DESCRIPTION OF THE INVENTION

Figure 1:
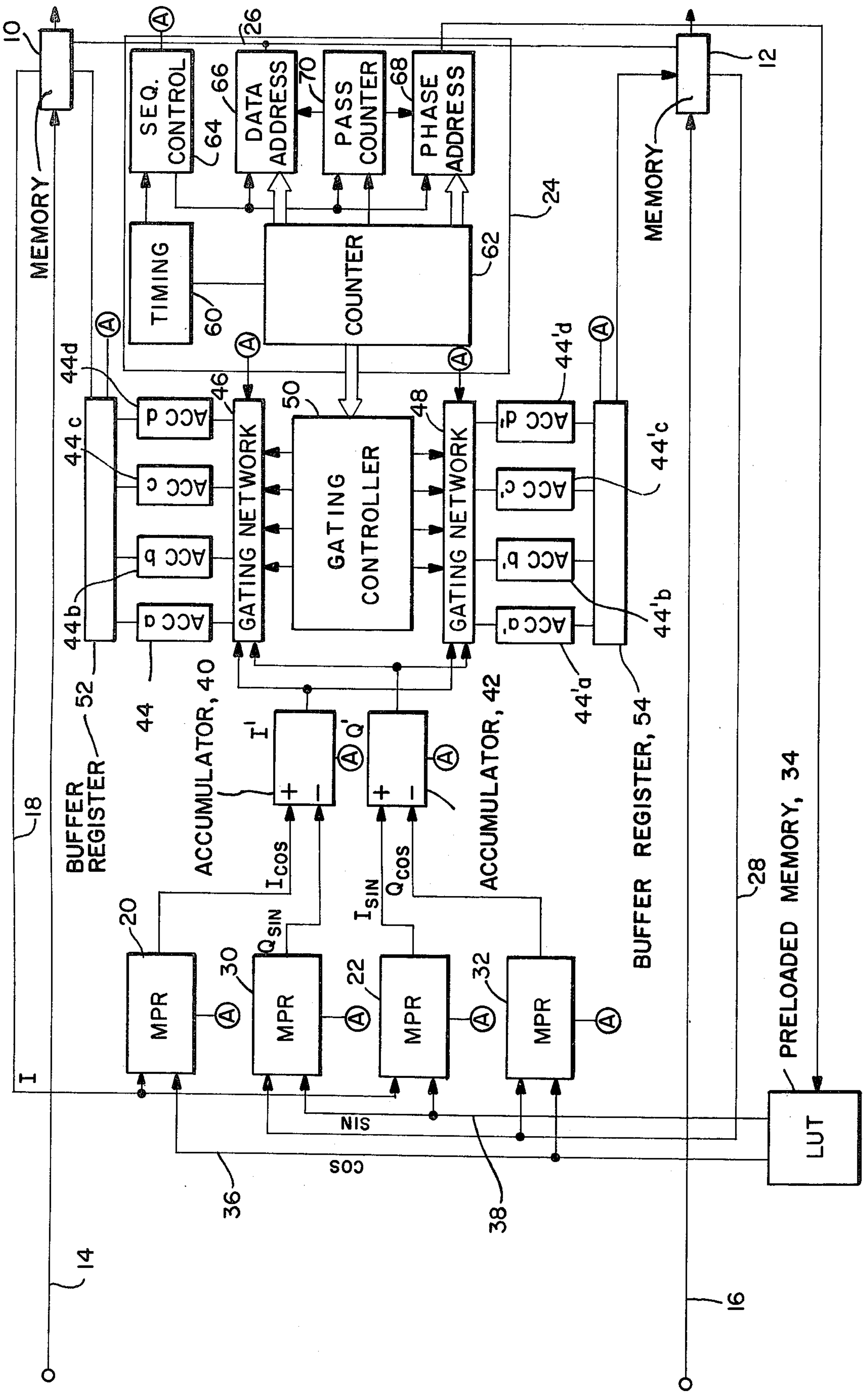
Figures 3, 4:
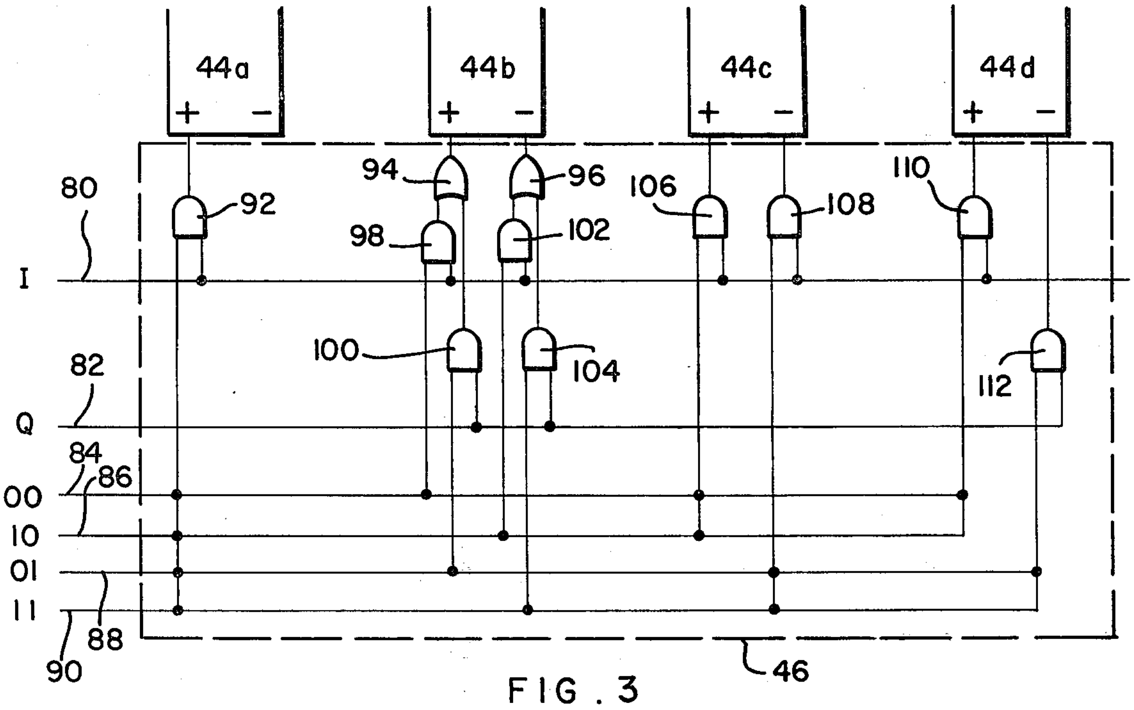
Figure 5:
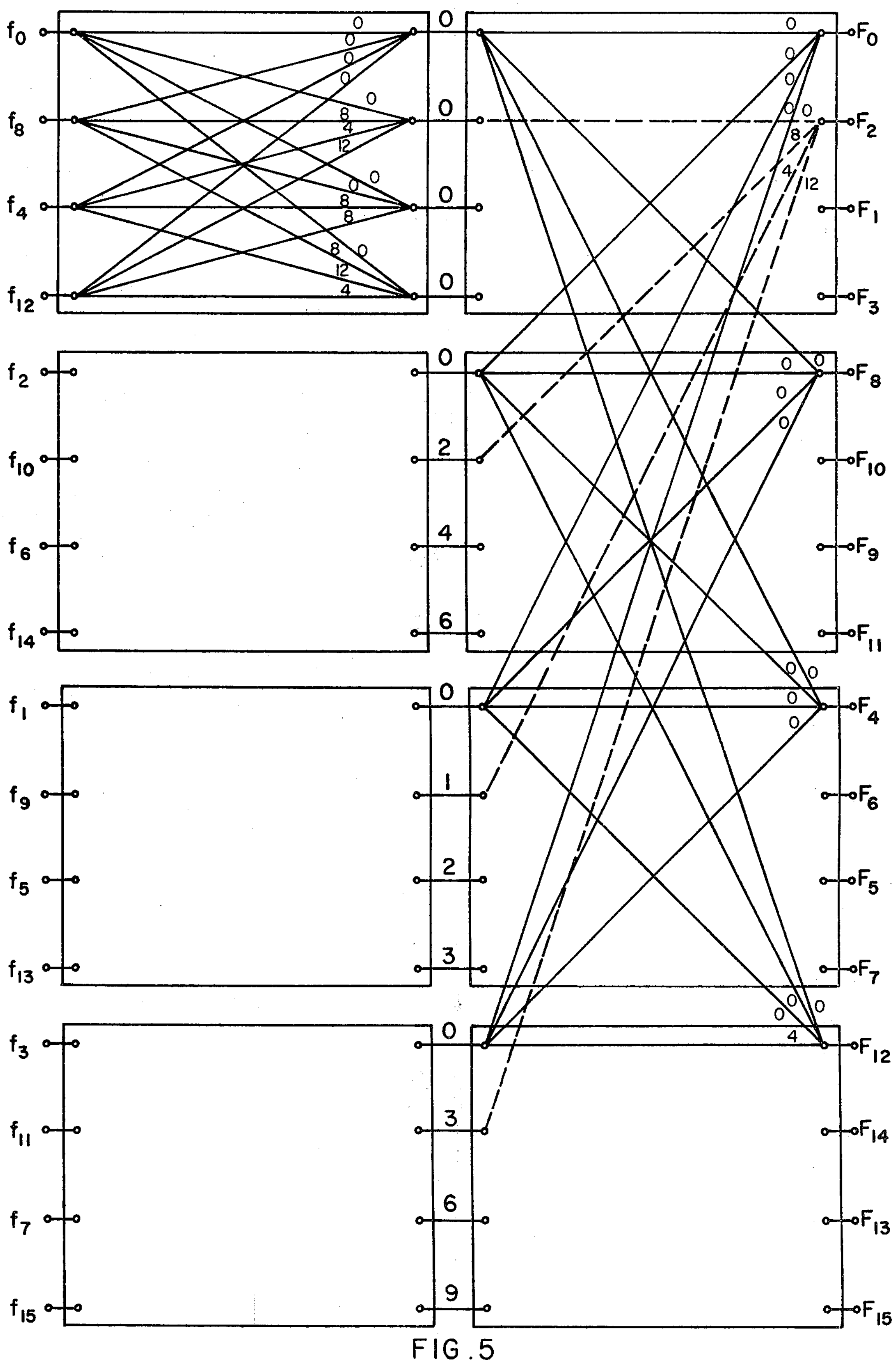
Figure 6:
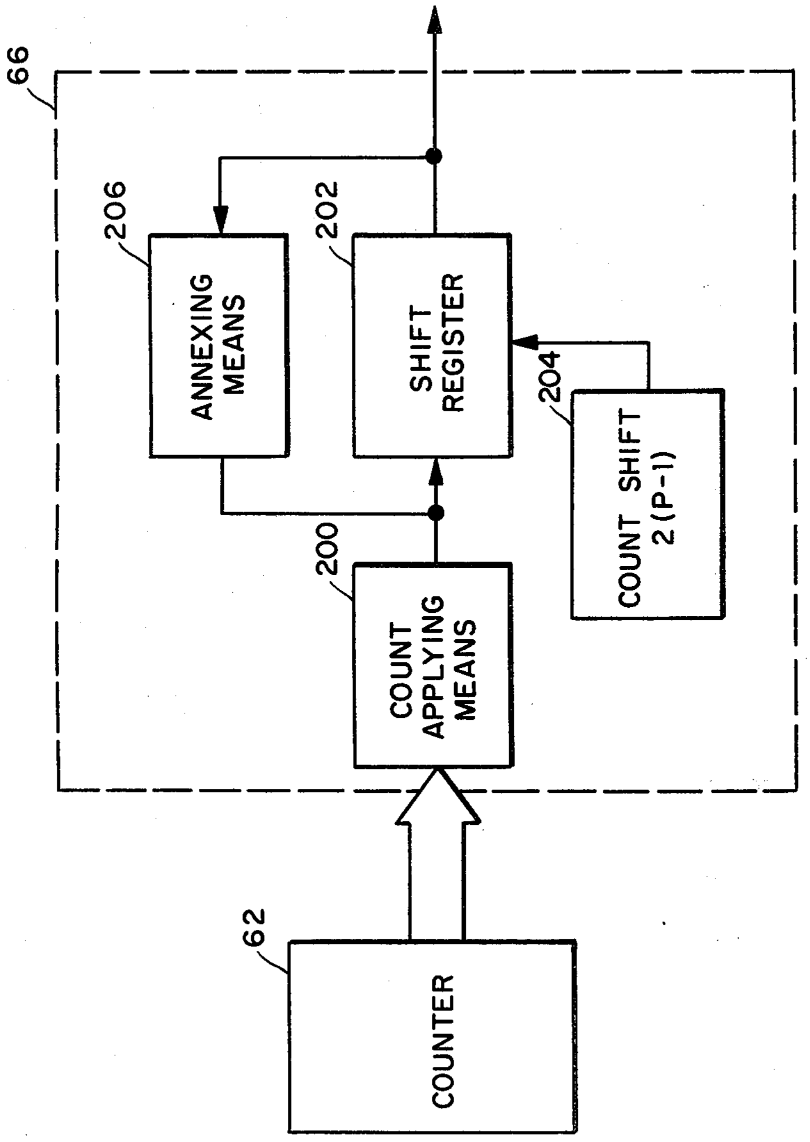

The foregoing and other and further objects and features of the present invention will become clearer on reference to the following detailed description of the invention when taken in conjunction with the accompanying drawings in which:

FIG. 1 is a block and line diagram of the signal analyzer of the present invention;

FIG. 2 comprised of FIGS. 2a–2d illustrates the operations performed by the signal analyzer of the present invention; and FIG. 3 is a schematic diagram of a gating controller for controlling the butterfly network;

FIG. 4 and 5 illustrate the operation of the signal analyzer for the transformation of $N = 16$ data points; and FIG. 6 is a block diagram of one embodiment of the Data Address generator of FIG. 1.

For purposes of illustration, it will be assumed that the data to be transformed is in complex form, i.e., in the form of $X = I + jQ$, where $I$ is the in-phase component and $Q$ the quadrature component. This format is obtained, for example, when the data is to be transformed has been translated in frequency, or is otherwise quadratuse sampled. This does not impose any limitation of significance on the processor, since the identical operations are performed on the real portion and on the imaginary portion of the input data. Thus, whether data is complex or pure real, it is processed in essentially the same way, and illustration of the processing of complex data will adequately describe the invention.

Turning now to FIG. 1, first and second memory devices 10 and 12, respectively, receive input data in the form of in-phase (I) and quadrature (Q) components over input lines 14 and 16, respectively. The memories 10 and 12 are of a size sufficient to accomodate the total number N of data points to be transformed. Thus, if 1024 points are to be transformed, the memories 10 and 12 must each be able to accomodate 1024 separate words, each word being at least of length equal to the bit length of the corresponding data point. Additionally, they are random access (addressable) memories such that data can be read into or out of any desired storage location in them by appropriately addressing them. Initially, data is read into the memories 10 and 12 sequentially, that is, starting with address 0 and proceeding toward address $N-1$. During the calculation of a transform, however, data is read into and out of these memories in different sequences, as will be described more fully below.

Data from the memory 10 is applied one word at a time over a lead 18 to first and second multipliers 20 and 22 respectively on the application to the memory of appropriate control signals from a controller 24, via a lead 26. Each control signal contains the address of a word to be read out from memory. Similarly, data from the memory 12 is read out one word at a time from corresponding addresses in response to the same control signals and is applied over a lead 28 to third and fourth multipliers 30 and 32, respectively. Concurrently, phase-correction factors from a preloaded memory 34 are applied over lines 36 and 38 to the multipliers 20, 22, 30 and 32. The memory 34 is a random access, read-only memory which is preloaded with factors of $W^\alpha$. They are stored in the memory at addresses corresponding to their arguments, i.e., the phase angles $\alpha$.

In general, these factors are complex quantities and each factor is thus represented by two words, one corresponding to the consine of a selected angle and the other corresponding to the sine of the angle. They are read out in pairs to the multipliers over leads 36 and 38, respectively, on receipt of a control signal accompanied by an address from the controller 24. Multiplier 20 forms the product I cos $\phi$ and applies it to an accumulator (arithmetic register) 40. Multiplier 30 forms the product Q sin $\phi$ and also applies it to accumulator 40 but with inverted sign. Accumulator 40 then contains the sum $(I \cos\phi - Q \sin\phi)$. Correspondingly, multipliers 22 and 32 form the products I sin $\phi$ and Q cos $\phi$ and apply these without sign reversal to an accumulator 42 to thereby form the sum $(I \sin \phi + Q \cos \phi)$.

These sums are the real and imaginary components of a single complex phase-shifted data point. These components are now applied to a butterfly formed from first and second sets of accumulators 44*a*, 44*b*, 44*c*, 44*d*, and 44'*a*, 44'*b*, 44'*c*, and 44'*d*, respectively, gating networks 46 and 48, and gating controller 50 which is driven from controller 24. Buffer registers 52 and 54 also controlled by controller 24, receive the contents of register 44 and 44', respectively, as four separate words after four data points have been processed and later read these words back into the respective addresses in memories 10 and 12 from which the data words were obtained, the contents of accumulator 44*a* being stored in the address in memory 10 from which the first data word in the sequence of four words was obtained, that of accumulator 44*b* being stored in the address in memory 10 from which the second data word in the sequence was, obtained, and so forth. The contents of accumulators 44'*a*, 44'*b*, etc. are transferred to the same addresses in memory 12. This is known as "in-place" processing.

After all N data points have thus been processed, the controller 24 recycles and a new pass is begun, using the results of the previous computation as the new data to be processed. On completion of $p = \log_4 N$ passes, the memories 10 and 12 contain the N real and imaginary components, respectively, of the complex Fourier coefficients. These components are in normal sequence, that is, memory addresses 0 of memories 10 and 12 contain the real and imaginary components respectively of the first Fourier coefficient Fo, memory addresses 1 of memories 10 and 12 contain the real and imaginary components respectively of the second Fourier coefficient $F_1$, etc.

Considering now the controller 24 in more detail, it consists of a master clock 60 which supplies timing signals to a counter 62 and a sequence controller 64. The counter 62 is a cyclic binary counter with period N, that is, it counts in binary from 0 to $N-1$ and then recycles. It drives a data address generator 66, a phase address generator 68, a pass counter 70, and gating controller 50. Sequence controller 64 also supplies timing signals to generators 66 and 68, as well as to pass counter 70, gating controller 50, buffers 52 and 54, and multipliers 20, 22, 30 and 32.

The data address generator 66 reverses the normal binary sequence of counter 62, shifts the reversed count $2(P-1)$ places to the right, and prefixes the shifted count with the $2(P-1)$ overflow bits resulting from the shift to thereby generate the address of the data to be selected from memory. It does this for each of the four points in each subset processed during a pass. Because the data read out from a given address is returned to the same address after processing, the address generator 66 holds the addresses of each subset of four points until these points are processed and ready for return to memory and then uses the addresses to return the processed data to the appropriate locations.

The phase address generator multiplies the $2(P-1)$ most significant bits of counter 62 by the reversed two least significant bits and supplies the product as an address to memory 34.

The pass counter 70 counts the passes (that is, the number of cycles of counter 62) from 0 to P and supplies this data to address generators 66 and 68. The gating controller 50 applies gating signals to gating networks 46 and 48 in accordance with the reverse of the two least significant bits of counter 62.

Turning now to FIG. 2, the mathematical operations performed by the transform circuitry of FIG. 1 are shown in detail. FIG. 2A shows a mathematical network or "flow graph" 80 commonly called a butterfly. In the present case, the network 80 is a four-point butterfly since it has 4 input nodes 82*a*, 82*b*, 82*c* and 82*d* and 4 output nodes 82'*a*, 82'*b*, 82'*c*, and 82'*d*. The input and output nodes are connected together by paths having transmission factors associated therewith. The output at any output node is obtained by multiplying the data at each of the input nodes by the appropriate transmission factors. The transmission factors are indicated as factors of W to the powers shown on the line joining input and output nodes. For example, the output at node 82'*b* is obtained by summing: the input at node 82$a$ multiplied by $W^0$, the input at node 82$b$ multiplied by $W^{N/2}$ the input at node 82$c$ multiplied by $W^{N/4}$, and the input at node 82$d$ multiplied by $W^{3N/4}$. The transmission factors between each output node and the input nodes are listed in parentheses to the right of each of the output nodes.

The flow graph of FIG. 2A may be represented mathematically by matrices as shown in FIG. 2B. As indicated therein, the operation indicated in FIG. 2A corresponds to the multiplication of 4 × 4 transmission matrix [W] by a 4 × 1 matrix [X]. As noted earlier, factors of $W^{1n/4}$, 1 = 0, 1, 2, 3, correspond to values +1 or −1 or $j$ or $-j$. Further, each data point xi is a complex quantity $I_i + iQ_i$, $i = 0, 1, \ldots N - 1$. Thus, the flow graph of FIG. 2A and the matrices of FIG. 2B perform the operation shown in FIG. 2C. As there noted, the transmission matrix [W] transforms the data point matrix [X] into a matrix which may be written as the sum two matrices, namely, a real matrix [I] and an imaginary matrix [Q]. Each of these latter matrices is a 4 × 1 matrix whose rows represent the sums of the components of the input data points applied thereto with appropriate phase changes. The matrix I is implemented in the accumulators 44, while the matrix Q is implemented in the accumulators 44'.

The summations indicated in the rows of these matrices is acutally performed by the accumulators 44 and 44', gating networks 46 and 48, and gating controller 50. The transmission factor to be applied to a data point to obtain a transformed point is a function of its address. Controller 50 examines the reversed two most significant bits of this address for each point and steers the phase-shifted data point into one or more of the accumulators 44$a$–$d$ and 44'$a$–$d$. The selection process is shown in FIG. 2D. Thus the real part $I_a$ of the first phase shifted data point (with reverse two most significant bits 00) is loaded into accumulators 44$a$, 44$b$, 44$c$ and 44$d$ with positive sign. The real part $I_b$ of the next point (with reverse two most significant bits 10) is loaded into accumulators 44$a$, 44$c$ and 44$d$ with positive sign and into 44$b$ with negative sign, etc. The imaginary parts Q are treated similarly.

A gating network that implements the operations of FIG. 2D is shown in FIG. 3. The network illustrated in network 46; network 48 is similar in construction and its construction and operation will be readily understood after considering the following description of the gating network 46. In FIG. 3, the I and Q components of the weighted data are applied to registers 44$a$, 44$b$, 44$c$ and 44$d$ over leads 80 and 82, respectively. Further, the reversed two most significant bits of the addresses of respective data points as computed by gating controller 50 are applied to leads 84, 86, 88 and 90 as shown. Each of the registers 44 has a positive (plus and a negative (minus) input terminal. Inputs supplied to the plus input terminal are added to the contents in the accumulator, while inputs supplied to the negative input terminal are subtracted from the contents of the accumulator. A first AND gate 92 has one input terminal connected to lead 80 and a second input terminal connected to leads 84, 86, 88 and 90. The output of gate 92 is connected to the plus input terminal of register 44a. This implements row 1 of the I matrix of FIG. 2D.

Register 44b has OR gates 94 and 96 connected to the plus and minus input terminals, respectively. Gate 94 receives inputs from AND gates 98 and 100, while gate 96 receives inputs from AND gates 102 and 104. AND gate 98 receives a first input from lead 80 and a second input from lead 84. AND gate 100 receives a first input from lead 82 and a second input from lead 88. AND gate 102 receives a first input from lead 80 and a second input from lead 86. Finally, AND gate 104 receives a first input from lead 82 and a second input from lead 90. This implements the second row of the I matrix of FIG. 2D.

Accumulators 44$c$ and 44$d$ have AND gates 106 and 110 connected to their plus input terminals and AND gates 108 and 112 connected to their minus input terminals, respectively. These implement rows C and D of the I matrix of 2D and need not be described in further detail.

FIG. 4 illustrates the calculation of the data addresses and the phase-correction addresses and factors for the transformation of $N = 16$ data points. In each case, the data address and phase-correction factors are determined from the contents of a cyclic counter of counting length 16 (N). The transformation requires two passes as shown. At the end of the second pass, the completed Fourier coefficients are stored in the memory addresses from which the data for the immediately preceding calculation was obtained. When all the coefficients are so stored, the memory may be read out in a normal order and these coefficients will thus appear in the order of $F_0$, $F_1$, $F_2$, $F_3$, $F_4$, etc.

FIG. 5 is a graphic illustration of the calculation sequence for transformation of $N = 16$ data points and shows the sequence and weighting factors for the calculations of $F_0$, $F_4$, $F_8$, and $F_{12}$, and $F_1$.

Now in more detail and referring to FIG. 6, data address generator 66 may include means for applying the count in counter 62 in reverse sequence to a shift register 202. Means 204 are provided for shifting the reverse count in shift register 202 by a factor dependent on the pass number. In one embodiment the shift register shifts the reverse count by a factor of $2(P\text{-}1)$ places to the right, where $P$ is the pass number. Annexing means 206 are also provided for annexing the digits shifted out of shift register 202 during the shift operation onto the end of the count opposite the end from which they were shifted.

From the foregoing, it will seem that we have provided an improved spectral analyzer. The analyzer rapidly calculates the Fourier coefficients of a sequence of data points presented to it. A single butterfly network is used to perform all the calculations, and this butterfly network is implemented with a minimum of components, the address sequence of the various data points to be processed, and the weighting factors to be assigned to the data points, are simply derived from the contents of a normal binary counter.

Use of a four point transform reduces the number of passes required for a transform. Further, it also reduces the operations performed by the butterfly to simply addition, subtraction, and gating operations which are quickly performed. By reducing the number of required multiplications, the round-off errors are diminished and accuracy is thereby greatly enhanced.

Having illustrated and described the preferred embodiment of our invention, we claim:

1. A signal analyzer for generating the discrete Fourier coefficients of a digital data sequence of N data points applied as input thereto, said analyzer comprising a counter which repetitively cycles through a count of N, means for storing the data in successive memory locations corresponding to the successive states of the counter which repetitively cycles through a count of N, means for sequentially retrieving the data in subsets of m points at a time from memory locations derived from the reverse count of the counter, means for phase shifting each sequentially retrieved data point in accordance with a phase factor derived from the reverse count of said counter, means for accumulating the phase shifted data points in selected ones of at least one set of $m$ registers in accordance with a data weighting factor derived from the reverse count of said counter, and means for storing the contents of said registers in corresponding ones of the locations from which the data points were retrieved, thereby to complete a pass for said data points.

2. A signal analyzer in accordance with claim 1 including means for generating a pass number from 1 to $\log_m N$ and means for applying said number to the data retrieving means and the data accumulating means for controlling the derivation of the memory locations from which data is retrieved and the deviation of the weighting factors applied to the retrieved data.

3. A signal analyzer according to claim 2 in which the data retrieving means includes a data address generator for generating the addresses of the data to be read from memory, said address generator comprising a shift register, means for applying the count in said counter in reverse sequence to said shift register, means for shifting the reverse count in said register by a factor dependent on the pass number; and means for annexing the digits shifted out of said register during said shift operation onto the end of the count opposite the end from which they were shifted.

4. A signal analyzer according to claim 3 in which said shift register shifts said reverse count by a factor of $2(P-1)$ places to the right, where $P$ is the pass number, and the annexing means prefixes the reverse count in said counter with the bits shifted out of said counter.

5. A signal spectrum analyzer for generating the discrete fourier coefficients of an N point input signal applied thereto, comprising means for selecting N/$m$ successive $m$-point subsets of the N-point input for processing.

phase correction means connected to multiply successive points presented thereto by selected phase correction factors thereby to produce phase corrected signals, means for presenting successive $m$-point subsets to said phase correction means, a butterfly network connected to said phase corrected signals for multiplying the points of successive subsets of phase-corrected points presented as input thereto by the same selected groups of weighting factors for each subset and providing an output for each input applied thereto.

storage means connected to said butterfly network for storing the outputs of said butterfly network.

6. A signal spectrum analyzer according to claim 5 in which the phase correction means includes storage means having a plurality of phase correction factors comprising the real and imaginary components of the factor $$\left(e^{\frac{-j2\pi\alpha}{N}}\right)$$

stored therein, where $\alpha$ is an integer from 0 to $N-1$ first and second multipliers, means applying the real and imaginary components of selected phase correction factors to the respective multipliers, means for applying a selected data point to each of said multipliers for multiplication therein by the selected phase correction components, and means for applying the resultant products to said butterfly net work.

7. A signal spectrum analyzer according to claim 5 in which said phase correction means includes storage means having stored therein phase-correction factors for application to said butterfly.

8. A signal spectrum analyzer according to claim 7 in which the phase-correction factor storage means stores said factors at addresses corresponding to arguments of $$\left(e^{\frac{-j2\pi\alpha}{N}}\right),$$

where $\alpha$ is the modified count corresponding to the desired phase correction factor.

9. A signal spectrum analyzer according to claim 5 in which said selection means selects points for processing in subsets of four points each, in which the butterfly network comprises 1. at least one accumulator for each point to be processed,
2. gating means for gating the inputs applied to said butterfly into selected ones of said accumulators in accordance with the order in which said inputs are presented thereto.

10. A signal spectrum analyzer according to claim 9 in which said butterfly network includes first and second set of accumulators, first and second gating networks connected to the respective accumulator sets, said first accumulator set including means for storing multiplier products corresponding to real products and said second accumulator set including means for storing products corresponding to imaginary products.

11. A signal spectrum analyzer according to claim 10 in which said weighting factors are given by $$[W] = \begin{matrix} W^0 & W^0 & W^0 & W^0 \\ W^0 & W^{N/2} & W^{N/4} & W^{3N/4} \\ W^0 & W^0 & W^{N/2} & W^{N/2} \\ W^0 & W^{N/2} & W^{3N/4} & W^{N/4} \end{matrix}$$

where $$W = e^{\frac{-j2\pi}{N}}$$

and [W] is a 4 × 4 matrix which operate on a 1 × 4 matrix of data points $$[X] = \begin{matrix} X_a \\ X_b \\ X_c \\ X_d \end{matrix}$$

presented to the butterfly net in in the sequence $X_a$, $X_b$, $X_c$, $X_d$ to form the products presented to said accumulators.

12. A signal spectrum analyzer according to claim 5 further including means for applying the outputs of said butterfly network to said storage means for storage therein in a specified sequence, and means for generating a reverse binary count, said selection means including 1. means for deriving a modified count from said reverse binary count by shifting the bits thereof by $\log_2 m$ positions with end-around carry for each iteration of the phase correction and weighting on groups of N/$m$ subsets, and
2. means for applying the modified count to said storage means as the address of data points to be selected for processing.

13. A signal spectrum analyzer according to claim 12 wherein said presenting means includes means for establishing at least one reiteration of the phase correction and weighting factor multiplication on a different group of $m$-point subsets.

14. A signal spectrum analyzer according to claim 13 in which the selecting means selects said inputs in subsets of $m=4$, and in which said weighting means is constructed to multiply the phase-corrected points by factors of ± or −1 and + or $-j$ only.

15. A signal spectrum analyzer according to claim 14 in which the means for establishing at least one reiteration includes means for generating a binary count corresponding to the phase correction and weighting of successive groups of N-points, which includes means in said selection means responsive to said count to establish the length of the shift to be performed during the processing of a selected group of points.

16. A signal spectrum analyzer according to claim 15 in which said butterfly network provides m successive outputs for each $m$-point applied thereto, and which includes means for applying said outputs to the same address in storage from which they were derived.

* * * * *

UNITED STATES PATENT OFFICE
CERTIFICATE OF CORRECTION

PATENT NO. : 3,920,978

DATED : November 18, 1975

INVENTOR(S) : Joseph W. Schmitt and Donald L. Starkey

It is certified that error appears in the above-identified patent and that said Letters Patent are hereby corrected as shown below:

Column 1, line 64, delete "those" and substitute --these-- therefor.

Column 11, line 1, delete "net in" and substitute therefor --network--.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*